United States Patent
Karuppusamy et al.

(10) Patent No.: US 11,658,518 B2
(45) Date of Patent: *May 23, 2023

(54) FOREIGN OBJECTION DETECTION SENSING CIRCUIT FOR WIRELESS POWER TRANSMISSION SYSTEMS

(71) Applicant: STMicroelectronics Asia Pacific Pte Ltd, Singapore (SG)

(72) Inventors: Baranidharan Karuppusamy, Singapore (SG); Thet Mon Sann, Singapore (SG); Kien Beng Tan, Singapore (SG); Supriya Raveendra Hegde, Edinburgh (GB); Huiqiao He, Singapore (SG); Teerasak Lee, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,824

(22) Filed: Aug. 23, 2021

(65) Prior Publication Data

US 2022/0103019 A1 Mar. 31, 2022

Related U.S. Application Data

(62) Division of application No. 17/037,982, filed on Sep. 30, 2020, now Pat. No. 11,152,822.

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC ....................................................... H02J 50/12
See application file for complete search history.

(56) References Cited

U.S. PATENT DOCUMENTS 5,132,889 A * 7/1992 Hitchcock ............... H02M 3/01
363/91
7,023,709 B2 * 4/2006 Lipcsei ............... H02M 3/3376
363/17

(Continued)

FOREIGN PATENT DOCUMENTS

CN 111208357 A 5/2020
WO 2020015746 A1 1/2020

OTHER PUBLICATIONS

Fukuda, Shinichi, et al: "A Novel Metal Detector Using the Quality Factor of the Secondary Coil for Wireless Power Transfer Systems," 2012 IEEE, IMWS-IWPT2012 Proceedings, pp. 241-244.

(Continued)

*Primary Examiner* — Daniel Kessie
(74) *Attorney, Agent, or Firm* — Crowe & Dunlevy

(57) ABSTRACT

A wireless power circuit operable in transceiver mode and in Q-factor measurement mode includes a bridge rectifier having first and second inputs coupled to first and second terminals of a coil, and an output coupled to a rectified node. An excitation circuit coupled to the first terminal, in Q-factor measurement mode, drives the coil with a pulsed signal. A protection circuit couples the first terminal to a first node when in Q-factor measurement mode and decouples the first terminal when in transceiver mode. A controller causes the bridge rectifier to short the first and second terminals to ground during Q-factor measurement mode. A sensing circuit amplifies voltage at the first node to produce an output voltage, and in response to the voltage at the first node rising to cross a rising threshold voltage, digitizes the output (Continued)

voltage. The digitized output voltage is used in calculating a Q-factor of the coil.

16 Claims, 12 Drawing Sheets

(56) References Cited

U.S. PATENT DOCUMENTS

| | | | |
|---|---|---|---|
| 7,116,568 B1* | 10/2006 | Birchenough | H02M 3/1582 363/17 |
| 9,906,148 B2* | 2/2018 | Sanchez | H02M 3/33592 |
| 9,939,539 B2 | 4/2018 | Oettinger | |
| 10,199,881 B2 | 2/2019 | Muratov et al. | |
| 10,530,191 B2 | 1/2020 | Russell et al. | |
| 10,566,849 B2 | 2/2020 | Nakano et al. | |
| 10,627,257 B2 | 4/2020 | Widmer et al. | |
| 2012/0200967 A1 | 8/2012 | Mikolajczak | |
| 2012/0223591 A1 | 9/2012 | Cheon et al. | |
| 2013/0020876 A1 | 1/2013 | Kim et al. | |
| 2017/0117755 A1 | 4/2017 | Muratov et al. | |
| 2017/0222489 A1 | 8/2017 | Nakano et al. | |
| 2017/0271908 A1 | 9/2017 | Li et al. | |
| 2019/0326786 A1 | 10/2019 | Kim et al. | |

OTHER PUBLICATIONS

Xia, Jinglin, et al: "Foreign Object Detection for Electric Vehicle Wireless Charging," Electronics 2020, 9, 805 doi:10.3390/electronics9050805, www.mdpi.com/journal/electronics, 26 pages.
Zhang, Yiming, et al: "A Review of Foreign Object Detection (FOD) for Inductive Power Transfer Systems," https://doi.org/10.1016/j.etran.2019.04.002, 2590-1168, 2019 Elsevier B.V. (10 pages).
EP Search Report and Written Opinion for family-related EP Appl. No. 21198160.0, report dated Feb. 25, 2022, 12 pages.

* cited by examiner

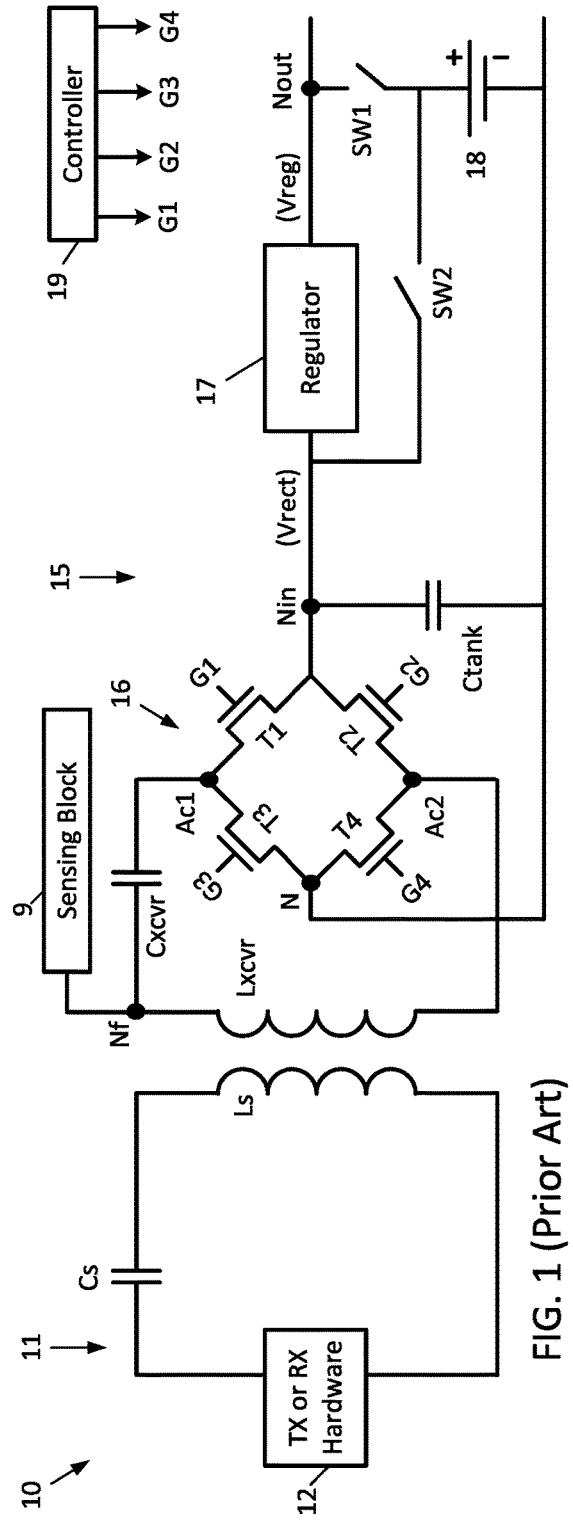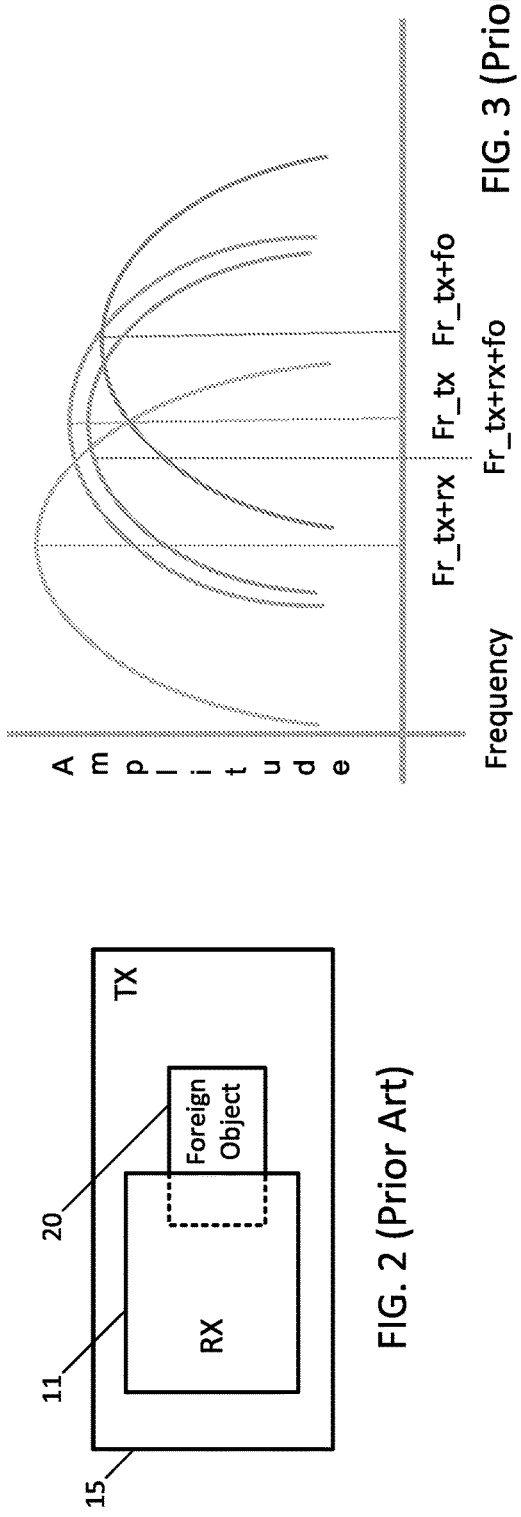
FIG. 1 (Prior Art)
FIG. 2 (Prior Art)
FIG. 3 (Prior Art)

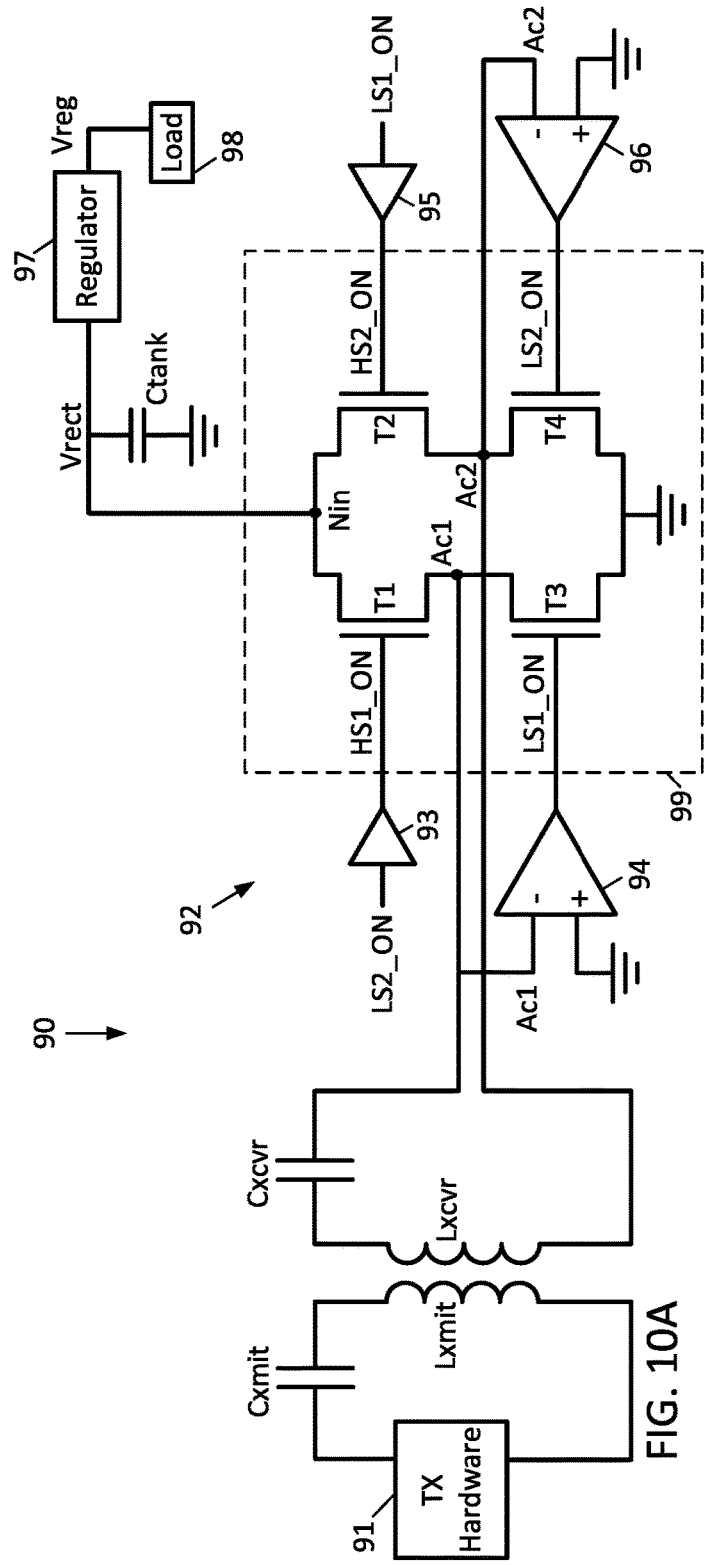
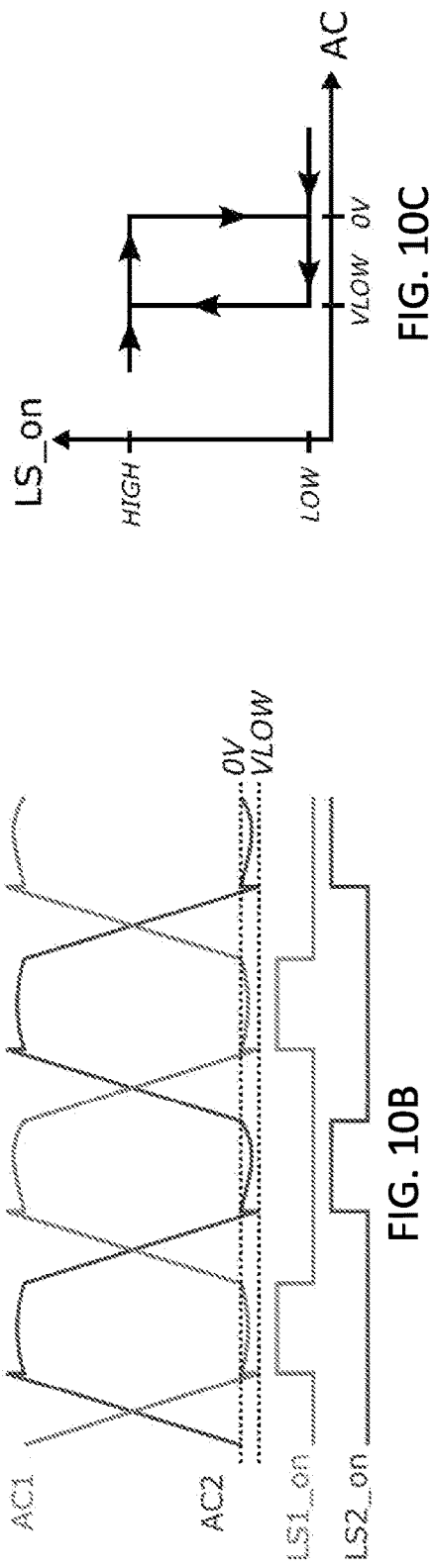
FIG. 10A
FIG. 10B
FIG. 10C

FOREIGN OBJECTION DETECTION SENSING CIRCUIT FOR WIRELESS POWER TRANSMISSION SYSTEMS

RELATED APPLICATION

This is a divisional of U.S. patent application Ser. No. 17/037,982, filed Sep. 30, 2020, the contents of which are incorporated by reference in their entirety to the maximum extent allowable under the law.

TECHNICAL FIELD

This disclosure is related to the field of wireless power transmission and, in particular, to a foreign objection detection sensing circuit for wireless power transmission systems.

BACKGROUND

Portable electronic devices, such as smartphones, smartwatches, audio output devices (earbuds, headphones), and wearables operate on battery power, not from wired power transmitted thereto over wired transmission lines and distribution systems. The batteries used for such devices are typically rechargeable and, therefore, a way to recharge the power of such batteries is necessary.

Most portable electronic devices include a charging port, typically conforming to the Micro USB or USB-C standards, into which a power cord connected to a power source can be inserted to provide for recharging of their batteries. However, such charging ports may make it difficult to enhance the water resistance of the electronic device, and are subject to damage from repeated use. In addition, some smaller portable electronic devices (for example, earbuds and smartwatches) may lack the available space to provide for a charging port. Still further, some users may find it cumbersome to plug a power cord into the charging port of an electronic device to charge the battery of that device.

Therefore, to address these issues, wireless power transmission has been developed. As shown in FIG. 1, a wireless power transmission system 10 may be comprised of a first device 11 and a second device 15. The first device 11 may be a device capable of wireless power transmission (for example, a smartphone) and/or wireless power reception (for example, a device to be wirelessly charged, such as a charging case for a pair of wireless earbuds or an active stylus), and the second device 15 may be a device capable of both wireless power transmission and wireless power reception, such as a smartphone.

The first device 11 includes a coil Ls (considered to be a secondary when receiving power; the capacitance Cs represents a tuning capacitance for the coil Ls) in which a time-varying current is induced by a time-varying electric field when receiving power, and hardware 12 that rectifies, regulates, and makes use of the time-varying current induced in the coil Ls to provide power to the device 11, for example to charge its battery.

The second device 15 includes a controlled switching bridge circuit (operable as either a bridge rectifier or a DC-AC inverter) 16 coupled to a transceiver coil Lxcvr at nodes Ac1 and Ac2, with a discrete capacitor Cxcvr being used to tune the second device 15. The controlled switching bridge circuit 16 is comprised of transistors T1-T4 controlled by gate voltages G1-G4.

A tank capacitor Ctank is coupled between node Nin and node N. A voltage regulator 17 has an input coupled to node Nin and an output coupled to node Nout. A battery 18 is selectively coupled between node Nout and node N by a switch SW1, and is selectively coupled between the node N and node Nin by a switch SW2. The switches SW1 and SW2 operate out of phase with one another; switch SW1 is closed while switch SW2 is opened when the second device 15 operates as a receiver in a power reception mode with the circuit 16 functioning as an AC-DC rectifier and the regulator functioning to generate the regulated voltage Vreg for charging the battery of the second device 15, and switch SW1 is opened while switch SW2 is closed when the second device 15 operates as a transmitter in a power transmission mode with the circuit 16 functioning as a DC-AC inverter powered by the battery 18 in a mode to transfer power supplied by battery 18 to the first device 11. A controller 19 generates the gate voltages G1-G4 for controlling the bridge 16 to operate in the desired rectifier/inverter mode.

When the second device 15 operates as a receiver, the controlled switching bridge circuit 16 rectifies the AC current flowing in transceiver coil Lxcvr to produce a DC current that charges the tank capacitor Ctank connected to the node Nin, and a rectified voltage Vrect is formed across the tank capacitor Ctank. The voltage regulator 17 produces a regulated output voltage Vreg at its output node Nout from that rectified voltage Vrect, which is provided to the battery 18 to thereby charge the battery 18.

When the second device 15 operates as a transmitter, the voltage of the battery 18 is applied to the node Nin by switch SW2 and becomes the voltage Vrect. Then, the gate voltages G1-G4 are driven by the controller 19 so as to generate a time-varying current flowing through the transceiver coil Lxcvr.

During wireless power transmission, a danger arises in that a conductive foreign object 20 may inadvertently be physically present between the first device 11 and second device 15, such as shown in FIG. 2. This is a concern because a conductive foreign object may have eddy currents induced therein by the device acting as a transmitter, which are dissipated as heat that can damage the devices. Therefore, it is desired for there to be a way to detect the presence of a conductive foreign object so that the wireless power transfer can be aborted or the amount of power transferred can be moderated. In the context of wireless power transmission system, foreign objects are electrically-conductive materials that are placed in the field, such as coins, keys, paperclips, etc., and that are not part of the wireless charging system and are not protected by the shielding in either the transmitting or receiving device. The alternating magnetic field between a transmitter and a receiver can induce eddy currents in these electrically conductive materials that are exposed to the field, the eddy currents cause those materials to heat up. Therefore, it is desired for these objects to be detected and removed from a wireless power transmission system for efficient power deliver and safety of operation.

The quality factor (Q-factor) of the second device 15, an indication of the efficiency of the power transferred thereto or thereby, may be measured by exciting with the time-varying electric field generated by the transceiver 15 while measuring the peak voltage developed at the node AC1, and then next damped peak voltage at same node AC1. To accommodate this, a Q-factor sensing block 9 is coupled to the coil Lxcvr. Q-factor measurement cycles may be interleaved with power transmission/reception cycles, but do not occur simultaneously.

Since the mutual induction between the coils Ls and Lxcvr will change dependent upon the condition of the system 10, the Q-factor of Lxcvr will change dependent upon the condition of the system 10. Therefore, from the Q-factor of Lxcvr, the second device 15 can infer the condition of the system 10. Possible relevant conditions of the system 10, when the second device 15 is acting as a transmitter, include: (i) both the first device 11 and the second device 15 being in proximity to one another, but not a foreign object 20, (ii) the second device 15 being in proximity to the foreign object 20 but not the first device 11, (iii) the second device 15 being in proximity to neither the first device 11 nor the foreign object 20, and (iv) both the first device 11 and the second device 15 being in proximity to one another as well as to the foreign object 20.

By modeling the wireless power transmission system 10 as a transformer, Q-factor curves for these different system conditions can be inferred. For example, with additional reference to FIG. 3, in case (i), the resonance amplitude of the coil Lxcvr will be higher than in other conditions and the resonance frequency of the system 10 will be lower than in other conditions, as illustrated in the Q-factor curve labeled as Fr_tx+rx. Similarly, in case (ii), the resonance amplitude of the coil Lxcvr is lower than in other conditions, and the resonance frequency of the system 10 is higher than in other conditions, as illustrated in the Q-factor curve labeled as Fr_tx+fo. For case (iii), the resonance amplitude of the coil Lxcvr is less than in case (i) but greater than in case (iii) while the resonance frequency of the coil Lxcvr is greater than in case (i) but less than in case (iii), as illustrated in the Q-factor curve labeled as Fr_tx. Case (iv) yields a similar resonance frequency as case (iii), but a slightly lesser resonance amplitude, as illustrated in the Q-factor curve labeled as Fr_tx+rx+fo. Therefore, by measuring the Q-factor of the coil Lxcvr, the second device 15 may determine the current condition of the system 10 and may take appropriate action (e.g., transmit at full power, transmit at a lesser power, cease transmission, etc).

Existing techniques for Q-factor measurement have proven to have insufficient accuracy to be able to use the results to properly discern case (ii) from case (iii), and to be able to discern case (i) from case (iv), since in case (ii) a foreign object is present but in case (iii) the foreign object is not present and since in case (iv) the foreign object is present but in case (i) the foreign object is not present. Therefore, further development is needed.

SUMMARY

Disclosed herein is a wireless power circuit operable in a transceiver mode and in a Q-factor measurement mode, the wireless power circuit including: a coil having first and second terminals; a bridge rectifier having a first input and a second input coupled to the first terminal and second terminal of the coil, respectively, and having an output coupled to a rectified voltage node; an excitation circuit coupled to the first terminal of the coil and configured to, when in the Q-factor measurement mode, drive the coil with a pulsed signal; a protection circuit coupling the first terminal of the coil to a first node when in the Q-factor measurement mode and decoupling the first terminal of the coil from the first node when in the transceiver mode; a controller configured to cause the bridge rectifier to short the first and second terminals of the coil to ground during Q-factor measurement mode; and a Q-factor sensing circuit. The Q-factor sensing circuit is configured to: amplify voltage at the first node to produce an output signal having an output voltage; and in response to the voltage at the first node rising to cross a rising threshold voltage, take a sample of the output voltage to produce a digitized output voltage, and provide the digitized output voltage to a processing circuit for use in calculating a Q-factor of the coil.

The rising threshold voltage may be equal to a common mode voltage plus a hysteresis amount.

The bridge rectifier may include: a first transistor having a first conduction terminal coupled to the rectified voltage node, a second conduction terminal coupled to the first input, and a control terminal coupled to receive a first gate voltage; a second transistor having a first conduction terminal coupled to the rectified voltage node, a second conduction terminal coupled to the second input, and a control terminal; coupled to receive a second gate voltage; a third transistor having a first conduction terminal coupled to the first input, a second conduction terminal coupled to ground, and a control terminal coupled to receive a third gate voltage; and a fourth transistor having a first conduction terminal coupled to the second input, a second conduction terminal coupled to ground, and a control terminal coupled to receive a fourth gate voltage.

The controller may include: a logic core generating first, second, third, and fourth pre-gate voltages; a first AND gate performing a logical AND operation on the first pre-gate voltage and an inverse of a Q-factor sensing enable signal that is asserted when in Q-factor sensing mode and otherwise deasserted to thereby produce the first gate voltage; a second AND gate performing a logical AND operation on the second pre-gate voltage and the inverse of the Q-factor sensing enable signal to thereby produce the second gate voltage; a first OR gate performing a logical OR operation on the third pre-gate voltage and the Q-factor sensing enable signal to thereby produce the third gate voltage; and a second OR gate performing a logical OR operation on the fourth pre-gate voltage and the Q-factor sensing enable signal to thereby produce the fourth gate voltage.

The processing circuit may calculate the Q-factor of the coil based upon an amplitude of a first sample of the output voltage taken at a first peak of the output voltage, and an amplitude of at least one other sample of the output voltage taken at another other peak of the output voltage.

The processing circuit may calculate the Q-factor of the coil based upon a first sample of the output voltage taken at a first peak of the output voltage, a second sample of the output voltage taken at a first trough of the output voltage, a third sample of the output voltage taken at another peak of the output voltage, and a fourth sample of the output voltage taken at another trough of the output voltage.

The excitation circuit may include: a driver configured to receive a driving signal and to generate an excitation signal based thereupon; and a transistor having a first conduction terminal coupled to a supply voltage, a second conduction terminal coupled to an anode of a diode through a resistance, and a control signal coupled to receive the excitation signal. The diode may have a cathode coupled to the first terminal of the coil.

The protection circuit may include a pair of series coupled transistors coupled between the first terminal of the coil and a first node, and having their gates coupled to a Q-factor sensing enable signal that is asserted when in Q-factor sensing mode and otherwise deasserted.

In the Q-factor measurement mode, the processing circuit may be configured to determine that a second wireless power circuit is in proximity to the wireless power circuit but that a foreign object is not present in between the second wireless power circuit and the wireless power circuit, by determining that a frequency of the output signal is less than a known frequency of the output signal in absence of the second wireless power circuit and the foreign object less a margin value.

In the Q-factor measurement mode, the processing circuit may be configured to determine that a second wireless power circuit is in proximity to the wireless power circuit but that a foreign object is present in between the second wireless power circuit and the wireless power circuit, by: determining that a frequency of the output signal is greater than a known frequency of the output signal in absence of a second wireless power circuit and a foreign object plus a margin value; determining that the frequency of the output signal is less than the known frequency of the output signal in the absence of the second wireless power circuit and the foreign object less the margin value; determining whether the Q-factor is less than a Q-factor margin value; determining whether a first sample of the output voltage is less than an amplitude margin value; and determining whether another sample of the output voltage is less than the amplitude margin value.

In the Q-factor measurement mode, the processing circuit may be configured to determine that a second wireless power circuit is not in proximity to the wireless power circuit and a foreign object is in proximity to the wireless power circuit, by: determining that a frequency of the output signal is greater than a known frequency of the output signal in absence of the second wireless power circuit and the foreign object plus a margin value; and causing the wireless power circuit to not wirelessly transmit power.

In the Q-factor measurement mode, the processing circuit may be configured to determine that a second wireless power circuit is not in proximity to the wireless power circuit and a foreign object is also not in proximity to the wireless power circuit, by determining that a frequency of the output signal is equal to a known frequency of the output signal in absence of the second wireless power circuit and the foreign object.

Also disclosed herein is a method of operating a wireless power circuit, the method including steps of: 1) exciting a coil of the wireless power circuit in an absence of a second wireless power circuit; 2) measuring a first resonance frequency at a sensing node of the wireless power circuit once excitation is released; 3) exciting the coil of the wireless power circuit; and 4) measuring a second resonance frequency at the sensing node once excitation is released. The method also includes the step of 5) based upon at least the first resonance frequency, the second resonance frequency, and a frequency margin value, determining whether: a) a second wireless power circuit is in proximity to the wireless power circuit but a foreign object is not present in between a second wireless power circuit and the wireless power circuit; and b) a second wireless power circuit is in proximity to the wireless power circuit but a foreign object is present in between the second wireless power circuit and the wireless power circuit.

Determining that the second wireless power circuit is in proximity to the wireless power circuit but the foreign object is not present in between the second wireless power circuit and the wireless power circuit may be performed by determining that the second resonance frequency is less than the first resonance frequency minus the frequency margin value. In response to determining that the second wireless power circuit is in proximity to the wireless power circuit but that foreign object is not present in between the second wireless power circuit and the wireless power circuit, the wireless power circuit may be caused to wirelessly transmit power at a full power level.

The method may also include determining a Q-factor of the coil by taking first and second samples of an output voltage at the sensing node. Determining that the second wireless power circuit is in proximity to the wireless power circuit but the foreign object is present in between the second wireless power circuit and the wireless power circuit may be performed by: determining that the second resonance frequency is greater than the first resonance frequency plus the frequency margin value; determining that the second resonance frequency is less than the first resonance frequency less the frequency margin value; determining whether the Q-factor is less than a Q-factor margin value; determining whether the first sample is less than an amplitude margin value; and determining whether the second sample is less than the amplitude margin value.

Determining that the second wireless power circuit is not in proximity to the wireless power circuit and the foreign object is in proximity to the wireless power circuit may be performed by determining that the second resonance frequency is greater than the first resonance frequency plus the frequency margin value.

In response to determining that the second resonance frequency is equal to the first resonance frequency, it may be determined that the second wireless power circuit is not in proximity to the wireless power circuit and the foreign object is also not in proximity to the wireless power circuit.

BRIEF DESCRIPTION OF THE DRAWINGS

FIG. 1 is a schematic block diagram of a wireless power transmission system in accordance with the prior art.

FIG. 2 is a diagram of the wireless power transmission system of FIG. 1, with a foreign object positioned between the first and second devices.

FIG. 3 is a graph showing amplitude vs. frequency curves of the signal at node Nf of FIG. 1 during Q-factor measurement mode, at different positions of the second device relative to the first device and the foreign object.

FIG. 10A is a schematic block diagram of a transceiver device capable of receiving power wirelessly from a transmitter device, utilizing hysteresis comparators described herein.

FIG. 10B is a graph of the hysteresis comparators used in the bridge of the transceiver device of FIG. 10 in operation.

FIG. 10C is a graph of operating characteristics of the hysteresis comparators of FIG. 10B.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 4:
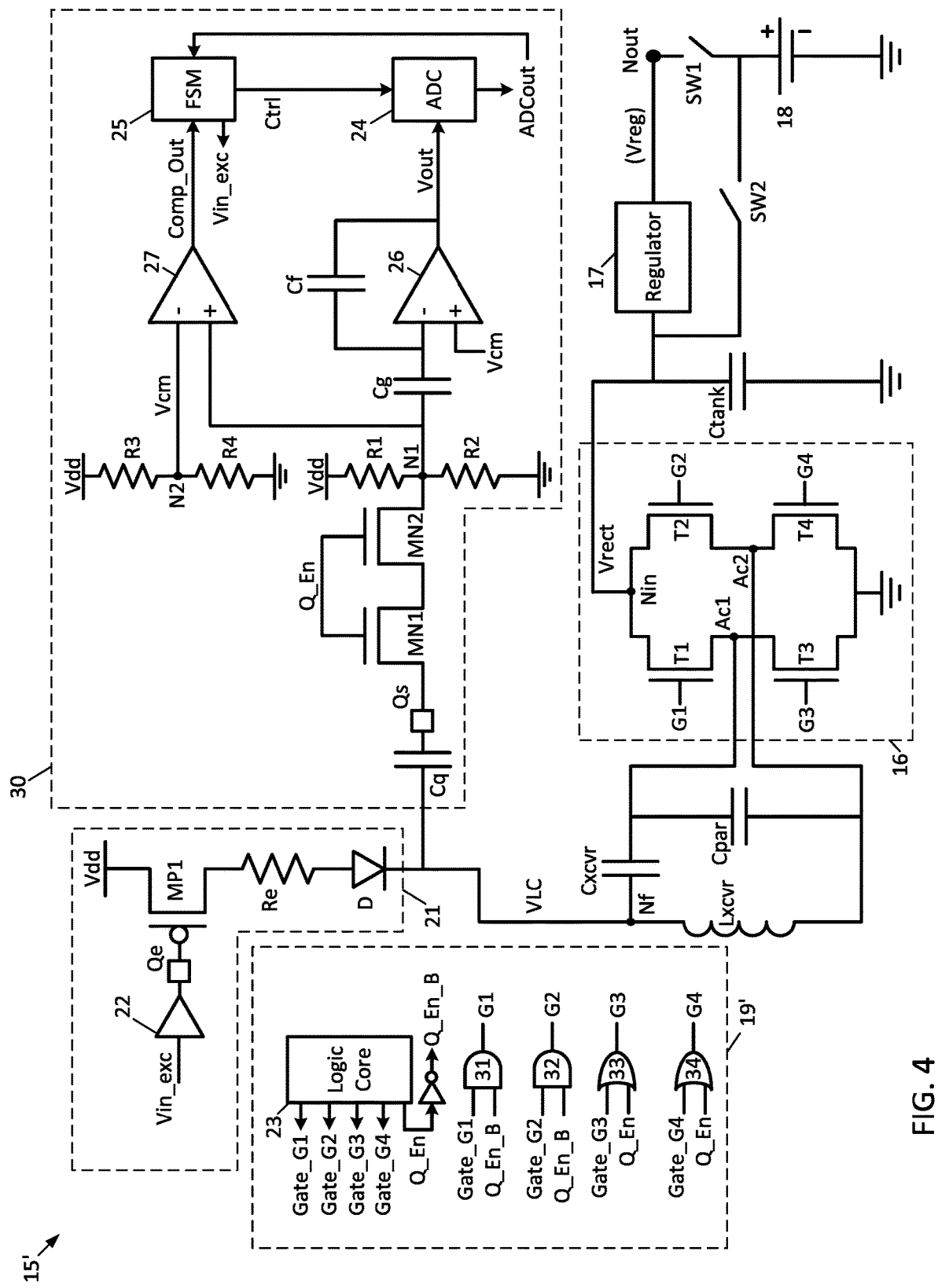
FIG. 4 is a schematic block diagram of a wireless power transmission device, such as may be used as the second device of the wireless power transmission system of FIG. 1, as described herein.

Described herein with reference to FIG. 4 is a transceiver device 15', such as may be used with the wireless power transmission system 10 of FIG. 1, that incorporates a Q-factor sensor 30 and an excitation circuit 21 described herein.

The transceiver device 15' includes a controlled switching bridge circuit (operable as either a bridge rectifier or a DC-AC inverter) 16 coupled to a transceiver coil Lxcvr at nodes Ac1 and Ac2, with the capacitor Cxcvr representing the tuning capacitor to align the impedance matching, and the capacitor Cpar representing the parasitic capacitance purposefully added between nodes Ac1 and Ac2 to tune the impedance of the system The controlled switching bridge circuit 16 is comprised of transistors T1-T4 controlled by gate voltages G1-G4. In greater detail: the transistor T1 has a drain coupled to node Nin, a source coupled to node Ac1, and a gate coupled to gate voltage G1; the transistor T3 has a drain coupled to node Ac1, a source coupled to node N (which may be ground or another reference voltage), and a gate coupled to gate voltage G3; the transistor T2 has a drain coupled to node Nin, a source coupled to node Ac2, and a gate coupled to gate voltage G2; and the transistor T4 has a drain coupled to node Ac2, a source coupled to node N, and a gate coupled to gate voltage G4.

A tank capacitor Ctank is coupled between node Nin and ground. A voltage regulator 17 has an input coupled to node Nin and an output coupled to node Nout. A battery 18 is selectively coupled between node Nout and ground by a switch SW1, and is selectively coupled between node Nin and node Nout by a switch SW2. The switches SW1 and SW2 operate out of phase with one another; switch SW1 is closed while switch SW2 is opened when the transceiver device 15' operates as a receiver in a power reception mode with the circuit 16 functioning as an AC-DC rectifier and the regulator functioning to generate the regulated voltage Vreg for charging the battery 18, and switch SW1 is opened while switch SW2 is closed when the device 15' operates as a transmitter in a power transmission mode with the circuit 16 functioning as a DC-AC inverter powered by the battery 18.

A controller 19' generates the gate voltages G1-G4 for controlling the bridge 16 to operate in the desired rectifier/inverter mode. The controller 19' includes a logic core 23 generating control signals Gate_G1, Gate_G2, Gate_G3, and Gate_G4, as well as the Q-factor measurement enable signal Q_en, which is inverted to produce signal Q_En_B. A first AND gate 31 performs a logical-AND operation on the signals Gate_G1 and Q_En_B to produce the gate voltage G1. A second AND gate 32 performs a logical-AND operation on signals Gate_G2 and Q_En_B to produce the gate voltage G2. An OR gate 33 performs a logical-OR on signals Gate_G3 and Q_E to produce the gate voltage G3. An OR gate 34 performs a logical-OR on signals Gate_G4 and Q_En to produce the gate voltage G4.

When the transceiver device 15' operates as a receiver, the controlled switching bridge circuit 16 rectifies the AC current to produce a DC current that charges the tank capacitor Ctank connected to the node Nin, and a rectified voltage Vrect is formed across the tank capacitor Ctank. The voltage regulator 17 produces a regulated output voltage Vreg at its output node Nout, which is provided to the battery 18 to thereby charge the battery 18.

When the transceiver device 15' operates as a transmitter, the voltage of the battery 18 is applied to the node Nin by switch SW2 and becomes the voltage Vrect. Then, the gate voltages G1-G4 are driven by the controller 19 so as to generate a time-varying current flowing through the transceiver coil Lxcvr. Details of this control scheme may be found in U.S. patent application Ser. No. 16/669,068, filed Oct. 30, 2019, the contents of which are incorporated by reference in its entirety.

An excitation circuit 21 is coupled to the transceiver coil Lxcvr at node Ac1. The excitation circuit 21 is comprised of a p-channel transistor MP1 having a source coupled to a supply voltage Vdd, a drain coupled to a first terminal of resistor Re, and a gate coupled to a pad Qe to receive the signal Vin_exc as driven by a driver 22. The excitation circuit 21 also includes a diode D1 having an anode coupled to a second terminal of the resistor Re and a cathode coupled to the transceiver coil Lxcvr at node Ac1. Note here that the excitation circuit 21 is off-chip, as well as is the capacitor Cq described below, compared to the other components of the transceiver device 15'.

A Q-factor sensing circuit 30 includes a capacitor Cq coupled between the cathode of diode D and a pad Qs. An n-channel transistor MN1 has a drain coupled to the pad Qs, a source coupled to the source of an n-channel transistor MN2, and a gate coupled to the Q-factor measurement enable signal Q_en. The transistor MN2 has its source coupled to the source of the transistor MN1, its drain coupled to a tap node N1 between resistors R1 and R2 (which are series coupled between Vdd and ground), and its gate coupled to receive the Q-factor measurement enable signal Q_En. An amplifier 26 has an inverting input terminal coupled to node N1 through a capacitor Cg and has the inverting input terminal further coupled to an output of the amplifier through a capacitor Cf and further has an inverting terminal coupled to receive a common mode voltage Vcm. The capacitors Cg and Cf may be adjustable in some cases, allowing for adjustment of the gain of the amplifier 26. An output voltage Vout is produced at the output of the amplifier 26. This output voltage Vout is applied to the input of an analog to digital converter (ADC) 24 which converts the analog output voltage to a digital signal ADCout.

The Q-factor sensing circuit 30 also includes a comparator 27 having a non-inverting input terminal coupled to node N1, an inverting input terminal coupled to a tap node N2 between resistors R3 and R4 coupled in series between the supply voltage Vdd and ground as a voltage divider circuit to produce the common mode voltage Vcm at node N2, and an output at which a comparison output signal Comp_Out is generated. A finite state machine (FSM) 25 has inputs at which the comparison output signal Comp_Out and the digital signal ADCout are received, and outputs a control signal Ctrl to the ADC 24 as well as the Vin_exc signal. Note that since the capacitance of the capacitors Cg and Cf may be adjustable, permitting programming of the gain of the amplifier 26, the resolution of the samples produced by the ADC 24 may be adjusted as a result.

Figure 5:
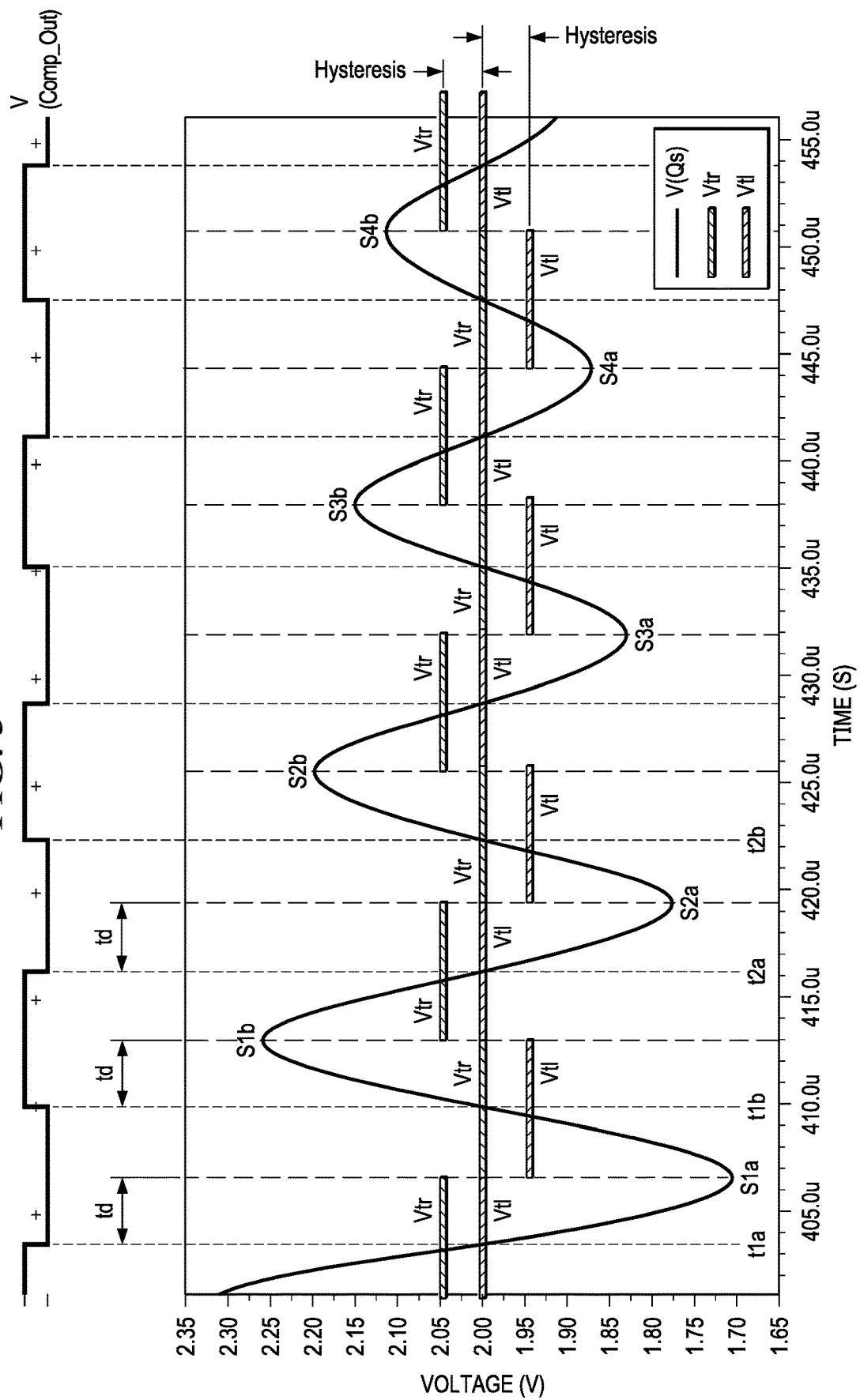
FIG. 5 is a graph showing performance of the comparator of FIG. 4 in response to the voltage VLC being input thereto.

Also note that the comparator 27 has rising and falling threshold values dynamically set by hysteresis dependent upon whether the voltage at its input are rising or falling. The comparator has both the comparator rising threshold Vtr and comparator falling threshold Vtl set to Vcm, but with the hysteresis maintained making the actual threshold voltages Vtr and Vtl dynamic, as shown in the graph of the voltage at pad Qs (which will be VLC) in FIG. 5. Therefore, when the voltage VLC is falling, the rising threshold Vtr is set to Vcm+hyseresis (2V+0.05V=2.05V in this example) and the falling threshold Vtl is set to Vcm (2V in this example); conversely, when the voltage VLC is rising, the falling threshold Vtr is set to Vcm-hysteresis (2V-0.05V=1.95V in this example) and the rising threshold Vtl is set to Vcm (2V in this example). Thus, the comparator 27 permits accurate zero cross (Vcm cross) detection, without compromising the ability of the comparator 27 to utilize hysteresis to reject noise during that zero cross detection.

The second device 15' may be operated in either transceiver mode (Rx or Tx) or Q-factor measurement mode.

During transceiver mode, the controller 19 generates the control signals G1-G4 so as to cause the circuit 16 to act as either a receiver or inverter, as described above. Additionally, during transceiver mode, the Q-factor measurement enable signal Q_en is deasserted, turning off transistors MN1 and MN2 to effectively isolate node Qs from Vcm while the diode D effectively blocks the transceiver signal from the circuit 21, and the switching action of the circuit 16 results in the voltage VLC across the coil Lxcvr switching between positive and negative maximum magnitudes, such as −50V and 50V.

In Q-factor measurement mode, the Q-factor measurement enable signal Q_en is asserted by the controller 19 to turn on transistors MN1 and MN2 to thereby establish a connection from the Qs pad to the center tap of the series connected resistors R1 and R2. In addition, the transistors T3 and T4 are simultaneously turned on by the controller 19 asserting the gate voltages G3 and G4, thereby shorting the nodes Ac1 and Ac2 to ground.

Then, the driver 22 drives the p-channel transistor MP1 through pad Qe with a pulse wave Vin_exc during an excitation period to produce an excitation signal, with the duty cycle, frequency, and number of cycles of the pulse wave Vin_exc being set by the firmware of the FSM 25. A graph of Vin_exc at pad Qe during the excitation period can be seen in FIG. 6. When Vin_exc is low during the excitation period, turning on the p-channel transistor MP1, the coil Lp sinks power from VDD; conversely, when Vin_exc is high turning the excitation period, the p-channel transistor MP1 is turned off.

Through this, the coil Lp is excited with a frequency and duty cycle set by Vin_exc. The pulse width and frequency of the excitation signal sets the excitation amplitude of the coil Lp. The excitation period continues until the coil Lxcvr reaches a steady state. The sensing circuit 30 is protected during the excitation phase by the diode D, resistor Re, and p-channel transistor MP1 having a voltage rating sufficient to withstand the voltage VLC at node Nf.

Figure 6:
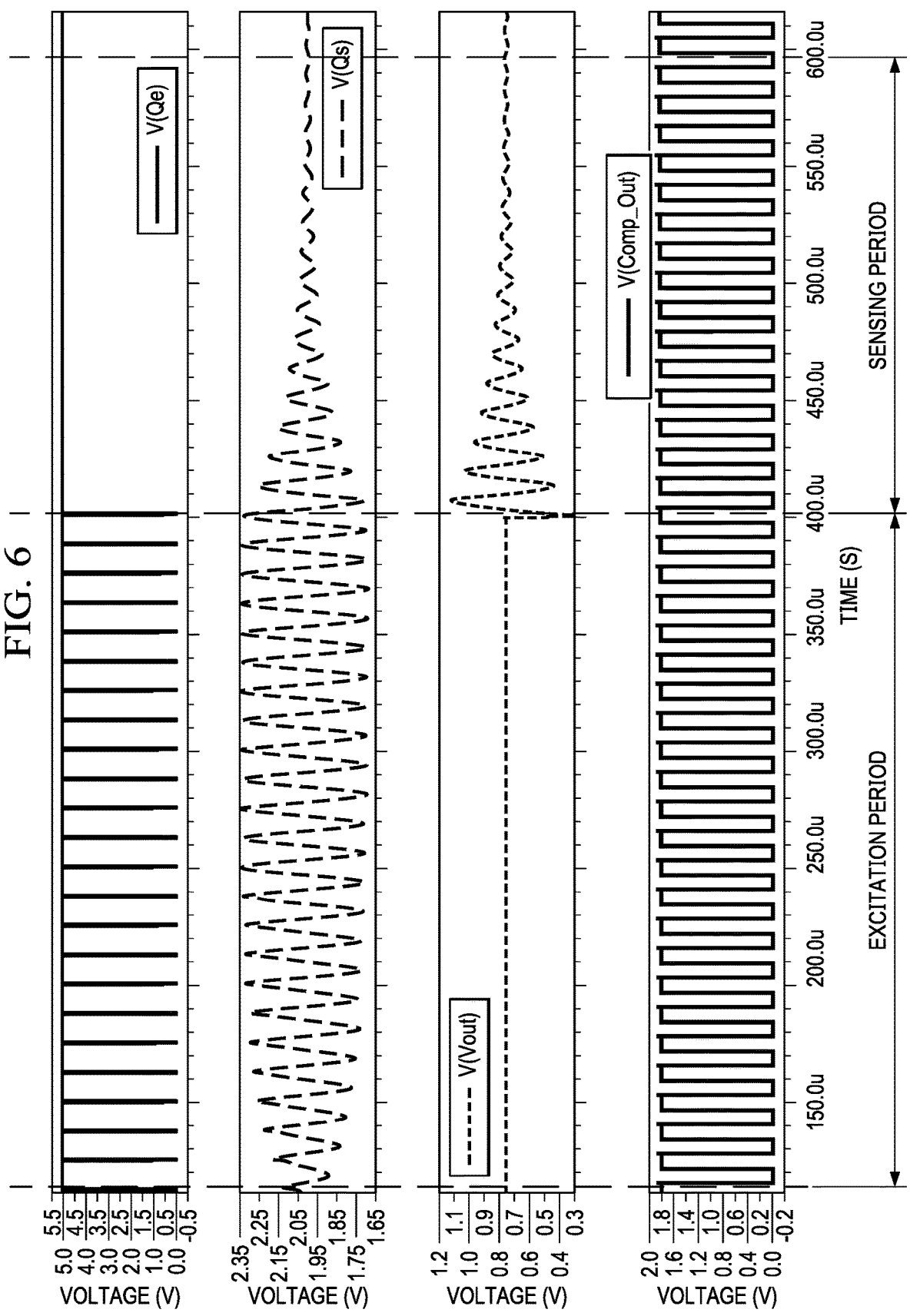
FIG. 6 is a graph showing the excitation signal, the voltage VLC, the output voltage, and the comparison output of FIG. 4 during both the excitation period and sensing period of the Q-factor measurement mode.

Once the excitation period is over, the response of the voltage VLC at node Qs (which will be a decaying sine wave oscillating about a common mode voltage Vcm set at the tap between the resistors R1 and R2, as shown in FIG. 6) is sensed by the sensing circuitry 23 through the capacitor Cq during a sensing period.

In particular, the comparator 27 asserts the Comp_Out signal when the voltage VLC undergoes a rising zero-cross (meaning that VLC rises above the Vtr threshold, with "zero" here being Vcm as modified by hysteresis, explained above), and deasserts the Comp_Out signal when the voltage VLC undergoes a falling zero-cross (meaning that VLC falls below the Vtl threshold, with "zero" being Vcm as modified by hysteresis as explained above). When the Comp_Out signal is asserted, and the FSM 25 in turn asserts the control signal Ctrl to thereby enable or trigger the ADC 24 to take a single sample, the sample being the digitized amplitude of the output voltage Vout as output by the amplifier 26 at the time delay td after the control signal Ctrl was asserted to produce an ADC output signal ADCout, which is received by FSM 25.

Figure 7:
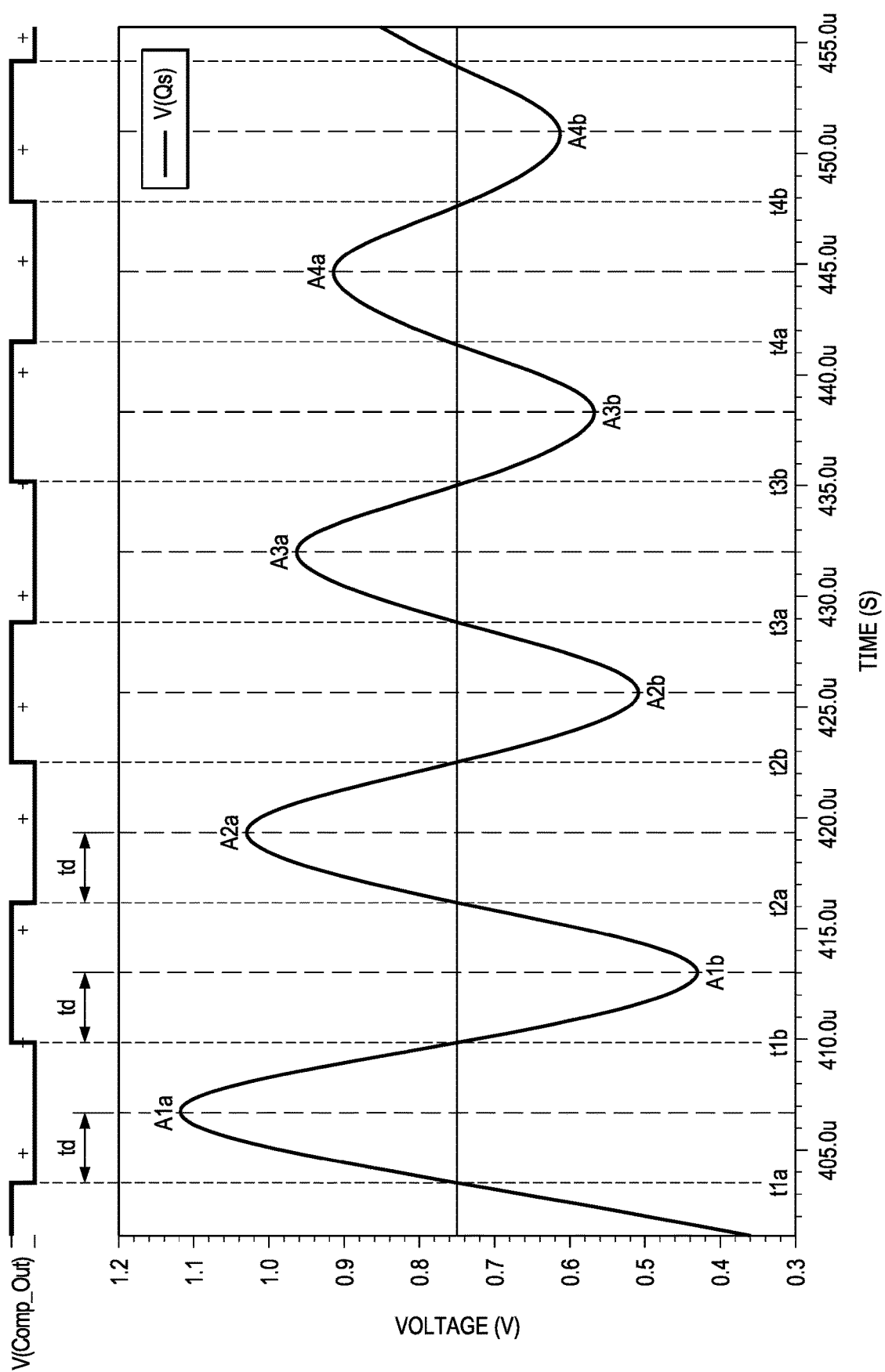
FIG. 7 is a graph showing the voltage VLC of FIG. 4 over time during the sensing period of the Q-factor measurement mode, when determining Q-factor according to a first technique.

A first way that the processing circuitry 31 can calculate the Q-factor from the samples is from two peak samples, for example referring to FIG. 7, as:

$$Q = \frac{\prod(N-1)}{\ln(A1/AN)}$$

where A1 is the amplitude of the first measured peak of Vout during the sensing period, and AN is the amplitude of the Nth measured peak during the sensing period.

When calculating the Q-factor using this first way, the FSM 25 stores the value of amplitude A1 and continues to compare the value of amplitude A1 to the current value of amplitude AN. When the value of amplitude AN is below half that of amplitude A1, the FSM 25 saves that value of amplitude AN, thereby reducing the number of values of amplitude AN stored for calculating the Q-factor, and reducing the size of a lookup table used for the natural logarithm function.

Figure 8:
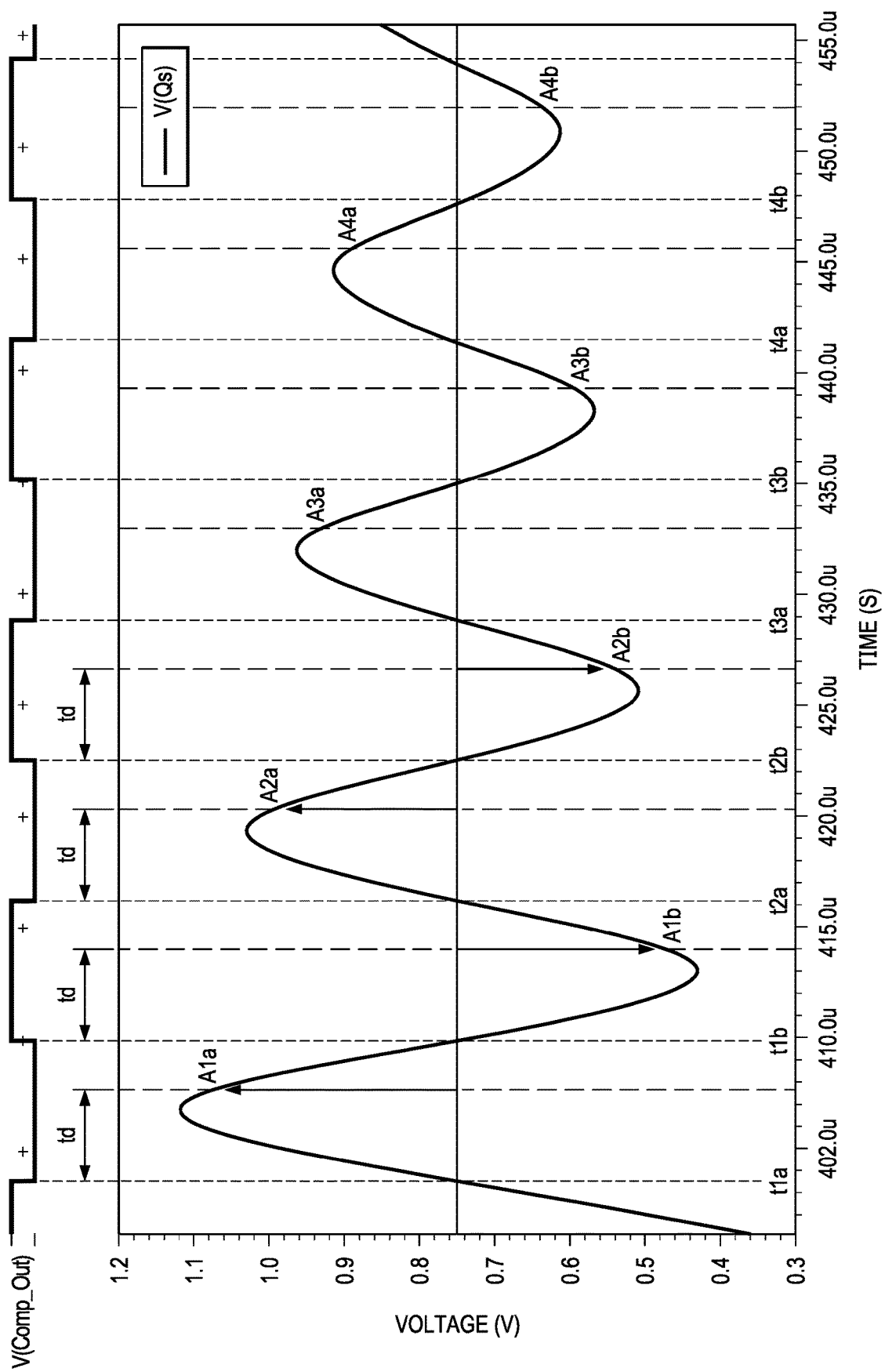
FIG. 8 is a graph showing the voltage VLC of FIG. 4 over time during the sensing period of the Q-factor measurement mode, when determining Q-factor according to a second technique.

The above described calculation is also effective if amplitude A1 is measured not only at the peak but also if amplitude A1 is measured at any point that is the time delay period td away from a zero crossing on the curve within the first oscillation cycle during the sensing period. For example, referring to FIG. 8, amplitude A1 could be measured at any point between t1a and t1b, provided that amplitude AN is also measured at the same time delay td away from a zero crossing on the curve within the Nth oscillation cycle, with the exception to both being where td=0, td=one half the period of the first oscillation, or where td=the period of the first oscillation.

In order to remove error introduced by DC offset and/or flicker noise of the amplifier 26, the peak and valley of the oscillation cycle may be utilized. For example, referring to FIG. 8, amplitude A1a and A1b samples may be taken, and amplitude ANa and ANb samples may be taken, and the calculation of the Q-factor may be performed as:

$$Q = \frac{\prod(N-1)}{\ln\left(\dfrac{A1a - A1b}{ANa - ANb}\right)}$$

When calculating the Q-factor using this second way, the FSM 25 stores the value of A1a-A1b and continues to compare the value of A1a-A1b to the current value of ANa-ANb. When the value of ANa-ANb is below half that of Ala-Alb, the FSM 25 saves those values of amplitude ANa and amplitude ANb, thereby reducing the number of values of ANa-ANb stored for calculating the Q-factor, and reducing the size of a lookup table used for the natural algorithm function.

Figure 9:
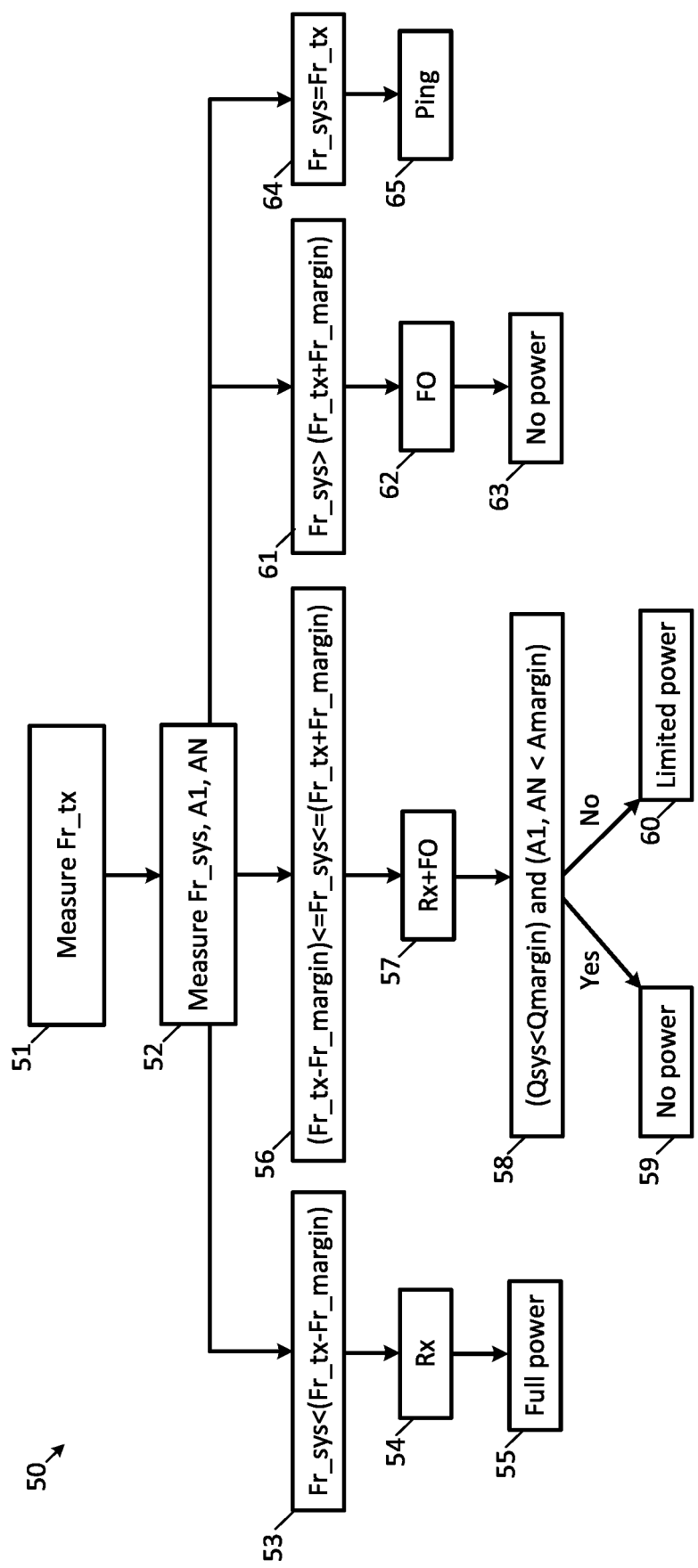
FIG. 9 is a flowchart illustrating the use of data collected during Q-factor mode so as to determine the presence or absence of foreign objects and the actions taken by the wireless power transmission device in response thereto.

Now that Q-factor calculation using the second device 15' has been described, an operating technique for foreign object detection utilizing the calculated Q-factor is now described with additional reference to the flowchart 50 of FIG. 9. This technique begins with a calibration. During the calibration, it is known that the first device 11 and the foreign object are not in proximity to the second device 15', and the second device 15' is set in Q-factor measurement mode. Then, the excitation period as described above occurs (e.g., the second device 15' is excited without the presence of the second device 11), and its output voltage Vout is sampled during the sensing period. From the samples of Vout, the frequency of Vout during the sensing period, which is the resonance frequency of the second device 15', is determined, and saved as Fr_tx, completing the step of Block 51.

Now, the operation of the second device 15' and its FSM 25 for performing foreign object detection is described. Beginning with the step at Block 52, when it is not known whether the first device 11 and/or the foreign object are in proximity to the second device 15', the Q-factor measurement mode is engaged, the excitation period as described above occurs, and the output voltage Vout is sampled during the sensing period. From the samples of Vout, the frequency of Vout during the sensing period, which is the resonance frequency of the system (second device 15', first device 11 if present, and foreign object if present), is determined by the FSM 25 and saved as Fr_sys. The first sample of Vout, amplitude A1 is also saved by the FSM 25, as is the amplitude AN sample used together with the amplitude A1 sample to determine the Q-factor, completing the step of Block 52.

If Fr_tx less a margin Fr_margin is greater than Fr_sys at the step of Block 53, then it can be inferred by the FSM 25 that the first device 11 is present but a foreign object is not present at the step of Block 54, so the second device 15' can proceed with transmitting full power wirelessly at the step of Block 55, and this is effectuated by the FSM 25 instructing the logic core 23 accordingly. Regarding the margin Fr_margin, this is a set tolerance threshold either estimated or profiled.

If Fr_sys is less than Fr_tx plus Fr_margin, but greater than Fr_tx-Fr_margin at the step of Block 56, then it can be inferred by the FSM 25 that both the first device 11 and a foreign object are present at the step of Block 57. So as to provide for enhanced accuracy at this step, here, the Q-factor calculated during the Q-factor measurement mode (shown here as Qsys) is compared a Q-factor margin value (shown here as Qmargin) and the amplitude A1 or AN samples are compared to an amplitude margin value (shown here as Amargin). In particular, if Qsys is less than Qmargin, amplitude A1 is less than Amargin, or amplitude AN is less than Amargin at the step of Block 58, then it can be inferred by the FSM 25 that the foreign object is positioned between the first device 11 and second device 15' or sufficiently conductive that it would be preferable for the second device 15' to not wireless transmit power at this point at the step of Block 59, and the FSM 25 instructs the logic core 23 accordingly. On the other hand, if Qsys is greater than Qmargin, or if amplitude A1 is greater than Amargin, or if amplitude AN is greater than Amargin, then it can be inferred by the FSM 25 that the foreign object is either not positioned sufficiently between the first device 11 and second device 15' or is not sufficiently conductive such that the second device 15' can wireless transmit limited power at the step of Block 60, and the FSM 25 instructs the logic core 23 accordingly.

If Fr_sys is equal to Fr_tx at the step of Block 64, then it can be inferred by the FSM 25 that neither the first device 11 nor a foreign object are present, so periodic pinging can be performed (e.g., every few seconds to check for presence of the first device 11) at the step of Block 65, and the FSM 25 instructs the logic core 23 accordingly.

Note here that sufficiently non-conductive objects, such as a plastic case for a smartphone, may have no appreciable effect on the output voltage Vout.

As stated above, the comparator 27 utilized by the transceiver device 15' has rising and falling threshold values dynamically set by hysteresis dependent upon whether the voltage at its inputs are rising or falling. The comparator has both the comparator rising threshold Vtr and comparator falling threshold Vtl set to Vcm, but with the hysteresis maintained making the actual threshold voltages Vtr and Vtl dynamic.

The advantages provided by this comparator 27 are perhaps best first described with reference to a more generic example of an electronic device 90 including transmitter hardware 91 and receiver or transceiver hardware 92, shown in FIG. 10A. The transmitter hardware 91 has a transmitter coil Lxmit coupled thereto, with a capacitor Cxmit being a tuning capacitor. The receiver hardware 92 includes a receiver coil Lxcvr, with a capacitor Cxcvr being a tuning capacitor. A bridge rectifier 99 has a first input node Ac1 coupled to the first terminal of the receiver coil Lxcvr and a second input node Ac2 coupled to the second terminal of the receiver coil Lxcvr. The bridge rectifier 99 has an output node Nin coupled to a voltage regulator 97, with a tank capacitor Ctank being coupled between the output node Nin and ground. A rectified voltage Vrect forms across the tank capacitor Ctank. A voltage regulator 97 receives the rectified voltage Vrect at its input, and outputs a regulated voltage Vreg at its output to a load 98.

The bridge rectifier 99 is comprised of a first n-channel transistor T1 having a drain coupled to the output node Nin, a source coupled to the input node Ac1, and a gate coupled to receive the high side on signal HS1_ON generated by driver 93 based upon the low side on signal LS2_ON; a second n-channel transistor T2 having a drain coupled to the output node Nin, a source coupled to the input node Ac2, and a gate coupled to receive the high side on signal HS2_ON generated by the driver 95 based upon the low side on signal LS1_ON; a third n-channel transistor T3 having a drain coupled to the input node Ac1, a source coupled to ground, and a gate coupled to receive the low side on signal LS1_ON, generated by a comparator 94 having its inverting terminal coupled to the input node Ac1 and its non-inverting terminal coupled to ground; and a fourth n-channel transistor T4 having a drain coupled to the input node Ac2, a source coupled to ground, and a gate coupled to receive the low side on signal LS2_ON, generated by a comparator 96 having its inverting terminal coupled to the input node Ac2 and its non-inverting terminal coupled to ground.

In operation, the transmitter 91 drives the transmitter coil Lxmit with a time varying current, resulting in a time varying current being induced in the receiver coil Lxcvr, which is in turn rectified by the rectifier 99. Operation of the rectifier 99 is as follows, with additional reference to FIG. 10B.

When the voltage at node Ac1 crosses zero and the voltage at node Ac2 goes high, the comparator 94 outputs the LS1_ON signal at a logic high, turning on the transistors T2 and T3. This has the effect of current flowing from the node Ac2 to the output node Nin through the transistor T2, and current flowing from node Ac2 to node Ac1 through the receiver coil Lxcvr, and from ground to node Ac1 through the transistor T3.

When the voltage at node Ac2 crosses zero and the voltage at node Ac1 goes high, the comparator 96 outputs the LS2_ON signal at a logic high, turning on the transistors T1 and T4. This has the effect of current flowing from the node Ac1 to the output node Nin through the transistor T1, from the node Ac1 to node Ac2 through the receiver coil Lxcvr, and from ground to the node Ac2 through the transistor T4.

The comparators 94 and 96 are hysteresis comparators having a rising threshold Vtr at, for example, 0V and falling threshold Vtl at, for example, −80 mV. This response characteristic can be seen in FIG. 10C. This lower threshold Vtl is utilized to help ensure that the direction of current flow in the receiver coil Lxcvr has full reversed before the comparator changes state, avoiding incorrect direction which could lead to oscillation of the output of the comparator.

Figure 11:
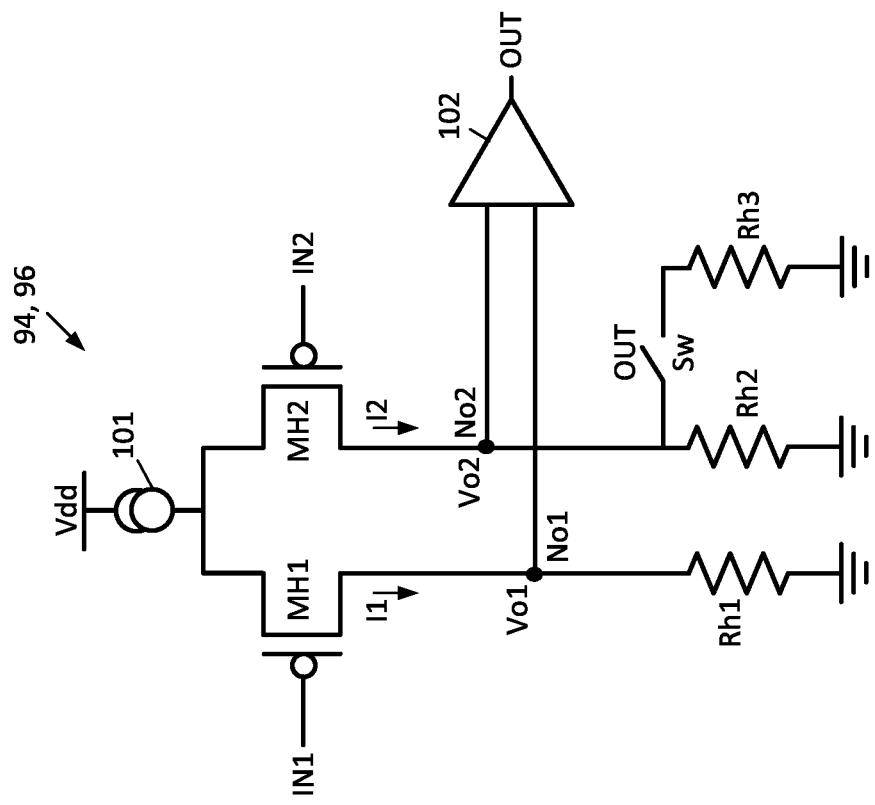
FIG. 11 is a schematic block diagram of the hysteresis comparators of FIGS. 10A-10C.

The novel design of the comparators 94 and 96 is shown in FIG. 11. Here, it can be seen that each comparator 94, 96 is comprised of: a first p-channel transistor MH1 having a source coupled to a tail current source 101, a drain coupled to ground through a transistor Rh1, and a gate forming the first comparator input (shown as IN1); a second p-channel transistor MH2 having a source coupled to the tail current source 101, a drain coupled to ground through a transistor Rh2, and a gate forming the second comparator input (shown as IN2). A resistor Rh3 is selectively connected in parallel with resistor Rh2 by a switch SW. A gain stage 102 (shown as an amplifier) has inputs coupled to the drains of the p-channel transistors MH1 and MH2 respectively at nodes No1 and No2, and its output OUT forming the output of the comparator 94, 96. The switch SW is operated as a function of the output OUT of the comparator 94, 96.

The comparator 94, 96 design shown in FIG. 11 operates as follows. When OUT is at a logic low, the switch SW is open and the output load of each side of the comparator is equal, because the resistances of Rh1 and Rh2 are equal. The triggering point of the comparator output OUT (to logic high) is at the point where the voltage Vo1 across Rh1 is equal to the voltage Vo2 across Rh2. Thus, the output current I1 output from the drain of the transistor MH1 is equal to the current I2 output from the drain of the transistor MH2 at the triggering point of the comparator since Von=In*Rhn, where n is either 1 or 2 depending on which side of the comparator structure is being referred to. Since the output current is proportional to the square of the input voltage, the output OUT of the comparator is asserted when IN1 is equal to IN2.

Now, when the output OUT is at a logic high, the switch SW closes. This results in the output load being imbalanced because resistors Rh2 and Rh3 are connected in parallel, so the voltage Vo2 becomes less than the voltage Vo1. As a result, the current I2 is increased to ensure that the voltage Vo1 is nevertheless equal to Vo2 to reach the triggering point. Hence, the comparator output does not trigger when IN1=IN2, and the trigger point (from the output OUT transitioning from high to low) is shifted depending on the value of the resistor Rh3.

This design hysteresis comparator is quite useful where the comparator, as shown, has a resistive load, and works well in the electronic device 90 described above.

However, PVT variations can cause offset, leading to the zero-crossing detection performed by the comparators 94, 96 being inaccurate, leading to this comparator design not being optimal for some applications. For example, this comparator design could be used as the comparator 27 in the transceiver device 15' described above, although functionality could be improved if the comparator 27 were to include an auto-zeroing offset cancellation component. The auto-zeroing offset cancellation component, however, cannot function with a resistive load, and therefore the auto-zeroing offset cancellation component is to have an active load.

Figure 12:
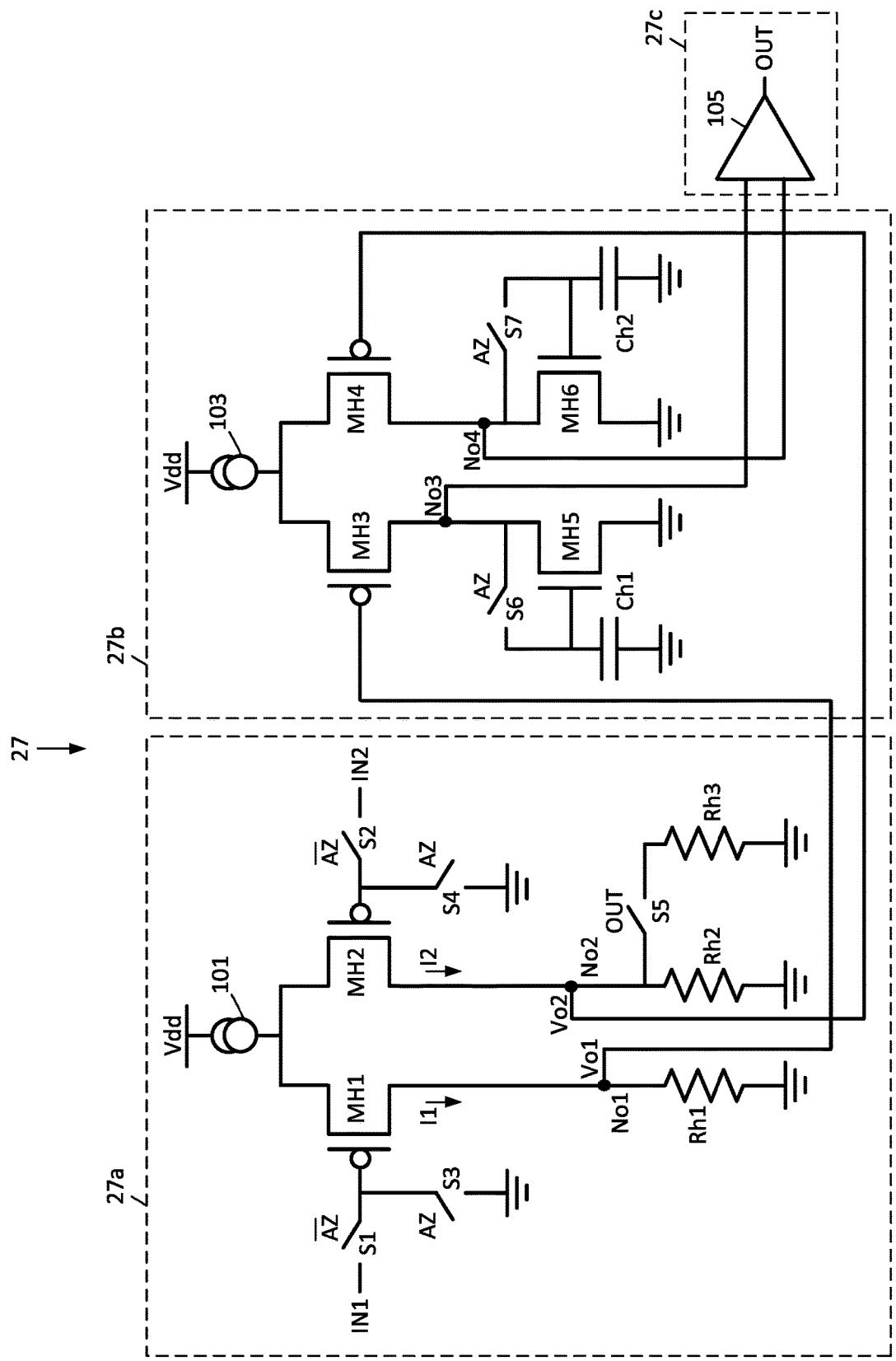
FIG. 12 is a schematic block diagram of a hysteresis comparator with an auto-zeroing stage, such as may be used with the wireless power transmission device of FIG. 4.

Such a design is shown in FIG. 12, and this design comparator 27 may also be used in the transceiver device 15' described above. The comparator 27 is comprised of a hysteresis stage 27a, an auto-zeroing stage 27b, and a gain stage 27c.

The hysteresis stage 27a is comprised of p-channel transistors MH1 and MH2 having their sources coupled to a current source 101 and their drains respectively coupled to nodes No1 and No2. A resistor Rh1 is coupled between node No1 and ground, and a resistor Rh2 is coupled between node No2 and ground. The resistors Rh2 and Rh3 may be equal in resistance. A switch S5, responsive to the output OUT of the comparator 27, selectively couples the resistor Rh2 in parallel with the resistor Rh3.

The gate of the p-channel transistor MH1 is selectively coupled to the input IN1 by switch 51, and switch 51 operates responsive to deassertion of an auto-zeroing signal AZ. The gate of the p-channel transistor MH1 is also selectively coupled to ground by the switch S3, responsive to assertion of the auto-zeroing signal. The gate of the p-channel transistor MH2 is selectively coupled to the input IN2 by switch S2, and switch S2 operates responsive to deassertion of the auto-zeroing signal AZ. The gate of the p-channel transistor MH2 is also selectively coupled to ground by the switch S4, responsive to assertion of the auto-zeroing signal.

The auto-zeroing stage 27b is comprised of p-channel transistors MH3 and MH4 having their sources coupled to a tail current source 103 and their drains respectively coupled to nodes No3 and No4. The gate of p-channel transistor MH3 is coupled to node No1, and the gate of p-channel transistor MH4 is coupled to node No2. An n-channel transistor MH5 has its drain coupled to node No3 and its source coupled to ground, while an n-channel transistor MH6 has its drain coupled to node No4 and its source coupled to ground. A switch S6, responsive to assertion of the auto-zeroing signal AZ, couples the gate of the n-channel transistor MH5 to the drain of the n-channel transistor MH5, as well as to the top plate of capacitor Ch1, the bottom plate of which is coupled to ground. A switch S7, responsive to assertion of the auto-zeroing signal AZ, couples the gate of the n-channel transistor MH6 to the drain of the n-channel transistor MH6, as well as to the top plate of capacitor Ch2, the bottom plate of which is coupled to ground.

The gain stage 27c is comprised of an amplifier having inputs coupled to nodes No3 and No4, and providing the comparator output OUT.

Operation of the comparator 27 shown in FIG. 12 is as follows. In auto-zeroing mode, the auto-zeroing signal AZ is asserted, opening the switches S1 and S2, while closing the switches S3, S4, S6, and S7. Any offset present resulting from resistance variation between the resistors Rh1 and Rh2 is amplified by the transistors MH3 and MH4 and sampled across capacitors Ch1 and Ch2.

When the auto-zeroing mode is when complete, the auto-zeroing signal AZ is deasserted, opening the switches S3, S4, S6, and S7. Note that the offset is still stored across capacitors Ch1 and Ch2. The deassertion of the auto-zeroing signal also serves to close switches 51 and S2 so as to receive input.

When OUT is at a logic low, the switch S5 is open and the output load of each side of the hysteresis stage 27a is equal, because the resistances of Rh1 and Rh2 are equal. The triggering point of the comparator output OUT (to logic high) is at the point where the voltage Vo1 across Rh1 is equal to the voltage Vo2 across Rh2. Thus, the output current I1 output from the drain of the transistor MH1 is equal to the current I2 output from the drain of the transistor MH2 at the triggering point of the comparator since Von=In*Rhn, where n is either 1 or 2 depending on which side of the hysteresis stage 27a is being referred to. Since the output current is proportional to the square of the input voltage, the output OUT of the comparator is asserted when IN1 is equal to IN2. Note that any imbalance in resistance between resistors Rh1 and Rh2 is compensated by n-channel transistors MH5 and MH6 as biased by the offset that was stored across capacitors Ch1 and Ch2 during auto-zeroing mode.

Now, when the output OUT is at a logic high, the switch S5 closes. This results in the output load being imbalanced because resistors Rh2 and Rh3 are connected in parallel, so the voltage Vo2 becomes less than the voltage Vo1. As a result, the current I2 is increased to ensure that the voltage Vo1 is nevertheless equal to Vo2 to reach the triggering point. Hence, the comparator output does not trigger when IN1=IN2, and the trigger point (from the output OUT transitioning from high to low) is shifted depending on the value of the resistor Rh3. Once again, as stated, any imbalance in resistance between resistors Rh1 and Rh2 is compensated by n-channel transistors MH5 and MH6 as biased by the offset that was stored across capacitors Ch1 and Ch2 during auto-zeroing mode.

Figure 13A:
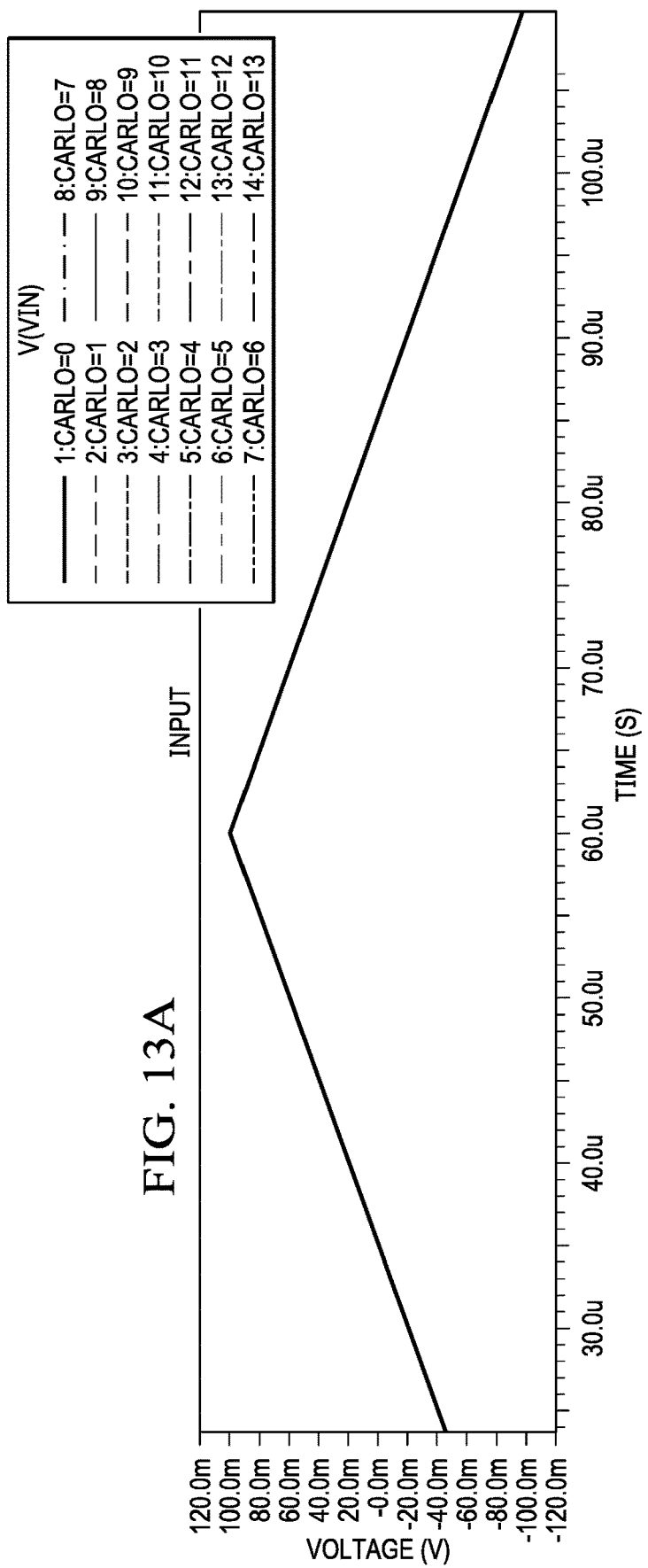
FIG. 13A-13C are graphs of operating characteristics of the hysteresis comparator of FIG. 12 with and without the auto-zeroing function.
Figure 13B:
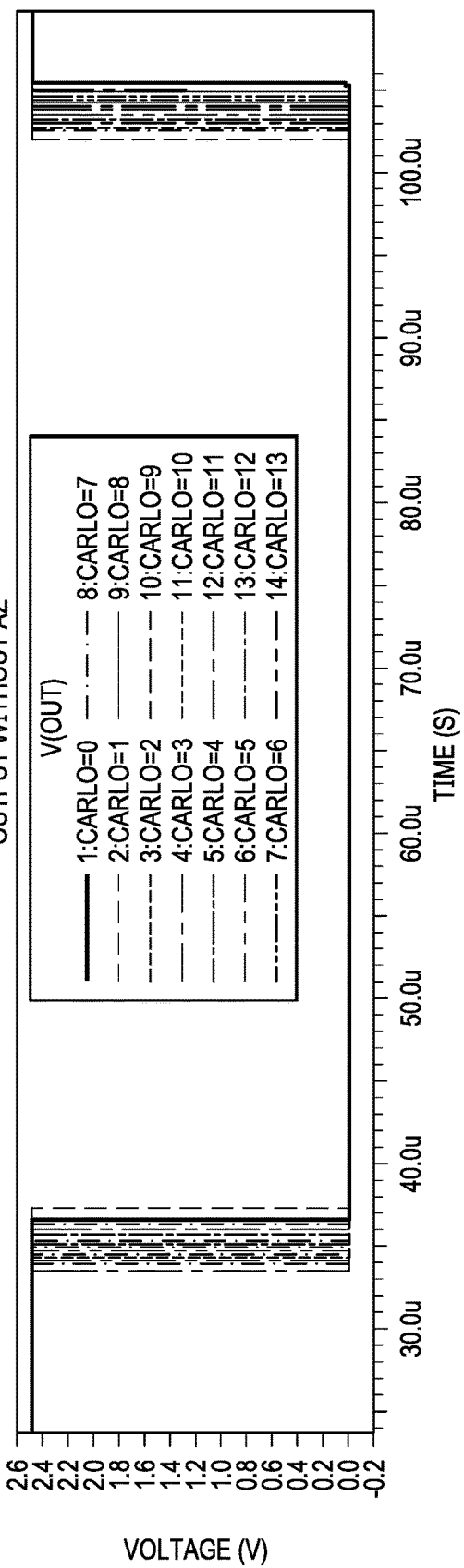
Figure 13C:
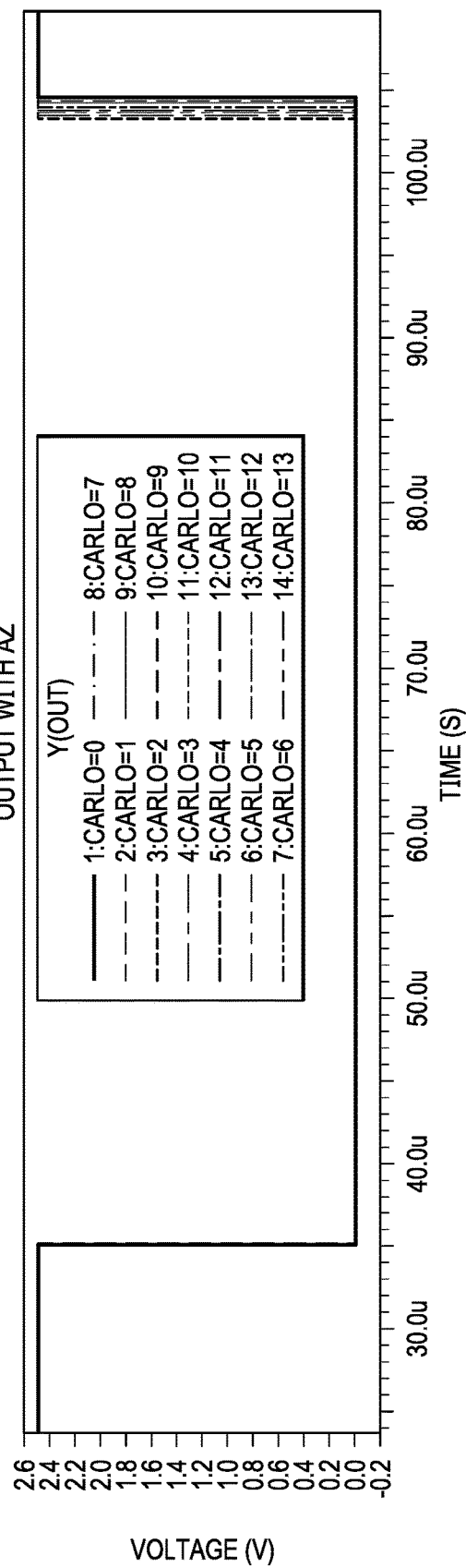

Shown in FIGS. 13A-13C are graphs of operating characteristics of the comparator 27 with and without the auto-zeroing function. Note that the hysteresis sets Vtr to be 0 V, and Vtl to be −75 mV. The offset without auto-zeroing at Vtr can be 15.3 mV and at Vtl can be 13.1; with auto-zeroing, the offset is reduced to 0.3 mV at Vtr and 5.7 mV at Vtl.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A wireless power circuit operable in a transceiver mode and in a Q-factor measurement mode, comprising:
a coil having first and second terminals;
a bridge rectifier having a first input and a second input coupled to the first terminal and second terminal of the coil, respectively, and having an output coupled to a rectified voltage node;
an excitation circuit coupled to the first terminal of the coil and configured to drive the coil with a pulsed signal in the Q-factor measurement mode;
a protection circuit coupling the first terminal of the coil to a first node in the Q-factor measurement mode and decoupling the first terminal of the coil from the first node in the transceiver mode;
a controller configured to cause the bridge rectifier to short the first and second terminals of the coil to ground during Q-factor measurement mode; and
a Q-factor sensing circuit configured to:
amplify voltage at the first node to produce an output signal having an output voltage; and
in response to the voltage at the first node rising to cross a rising threshold voltage, take a sample of the output voltage to produce a digitized output voltage, and provide the digitized output voltage useful in calculating a Q-factor of the coil.

2. The wireless power circuit of claim 1, wherein the rising threshold voltage is equal to a common mode voltage plus a hysteresis amount.

3. The wireless power circuit of claim 1:
wherein the bridge rectifier comprises:
a first transistor having a first conduction terminal coupled to the rectified voltage node, a second conduction terminal coupled to the first input, and a control terminal coupled to receive a first gate voltage;
a second transistor having a first conduction terminal coupled to the rectified voltage node, a second conduction terminal coupled to the second input, and a control terminal; coupled to receive a second gate voltage;
a third transistor having a first conduction terminal coupled to the first input, a second conduction terminal coupled to ground, and a control terminal coupled to receive a third gate voltage; and
a fourth transistor having a first conduction terminal coupled to the second input, a second conduction terminal coupled to ground, and a control terminal coupled to receive a fourth gate voltage; and
wherein the controller comprises:
a logic core generating first, second, third, and fourth pre-gate voltages;
a first AND gate performing a logical AND operation on the first pre-gate voltage and an inverse of a Q-factor sensing enable signal that is asserted in Q-factor sensing mode and otherwise deasserted to thereby produce the first gate voltage;
a second AND gate performing a logical AND operation on the second pre-gate voltage and the inverse of the Q-factor sensing enable signal to thereby produce the second gate voltage; a first OR gate performing a logical OR operation on the third pre-gate voltage and the Q-factor sensing enable signal to thereby produce the third gate voltage; and
a second OR gate performing a logical OR operation on the fourth pre-gate voltage and the Q-factor sensing enable signal to thereby produce the fourth gate voltage.

4. The wireless power circuit of claim 1, further comprising a processing circuit configured to calculate the Q-factor of the coil based upon an amplitude of a first sample of the output voltage taken at a first peak of the output voltage, and an amplitude of at least one other sample of the output voltage taken at another other peak of the output voltage.

5. The wireless power circuit of claim 1, further comprising a processing circuit configured to calculate the Q-factor of the coil based upon a first sample of the output voltage taken at a first peak of the output voltage, a second sample of the output voltage taken at a first trough of the output voltage, a third sample of the output voltage taken at another peak of the output voltage, and a fourth sample of the output voltage taken at another trough of the output voltage.

6. The wireless power circuit of claim 1, wherein the excitation circuit comprises:
a driver configured to receive a driving signal and to generate an excitation signal based thereupon; and a transistor having a first conduction terminal coupled to a supply voltage, a second conduction terminal coupled to an anode of a diode through a resistance, and a control signal coupled to receive the excitation signal; wherein the diode has a cathode coupled to the first terminal of the coil.

7. The wireless power circuit of claim 1, wherein the protection circuit comprises a pair of series coupled transistors coupled between the first terminal of the coil and a first node, and having their gates coupled to a Q-factor sensing enable signal that is asserted in Q-factor sensing mode and otherwise deasserted.

8. The wireless power circuit of claim 1, further comprising a processing circuit, wherein, in the Q-factor measurement mode, the processing circuit is configured to determine that a second wireless power circuit is in proximity to the wireless power circuit but that a foreign object is not present in between the second wireless power circuit and the wireless power circuit, by determining that a frequency of the output signal is less than a known frequency of the output signal in absence of the second wireless power circuit and the foreign object less a margin value.

9. The wireless power circuit of claim 1, further comprising a processing circuit, wherein, in the Q-factor measurement mode, the processing circuit is configured to determine that a second wireless power circuit is in proximity to the wireless power circuit but that a foreign object is present in between the second wireless power circuit and the wireless power circuit, by:
  determining that a frequency of the output signal is greater than a known frequency of the output signal in absence of a second wireless power circuit and a foreign object plus a margin value;
  determining that the frequency of the output signal is less than the known frequency of the output signal in the absence of the second wireless power circuit and the foreign object less the margin value;
  determining whether the Q-factor is less than a Q-factor margin value;
  determining whether a first sample of the output voltage is less than an amplitude margin value; and
  determining whether another sample of the output voltage is less than the amplitude margin value.

10. The wireless power circuit of claim 1, further comprising a processing circuit, wherein, in the Q-factor measurement mode, the processing circuit is configured to determine that a second wireless power circuit is not in proximity to the wireless power circuit and a foreign object is in proximity to the wireless power circuit, by:
  determining that a frequency of the output signal is greater than a known frequency of the output signal in absence of the second wireless power circuit and the foreign object plus a margin value; and
  causing the wireless power circuit to not wirelessly transmit power.

11. The wireless power circuit of claim 1, further comprising a processing circuit, wherein, in the Q-factor measurement mode, the processing circuit is configured to determine that a second wireless power circuit is not in proximity to the wireless power circuit and a foreign object is also not in proximity to the wireless power circuit, by determining that a frequency of the output signal is equal to a known frequency of the output signal in absence of the second wireless power circuit and the foreign object.

12. A method of operating a wireless power circuit to perform foreign objection detection, the method comprising:

1) exciting a coil of the wireless power circuit in an absence of a second wireless power circuit, using an excitation circuit connected to a coil;
2) determining a first resonance frequency at a sensing node of the wireless power circuit once excitation is released, using a Q-factor sensing circuit coupled between the coil and the sensing node;
3) exciting the coil of the wireless power circuit using the excitation circuit;
4) measuring a second resonance frequency at the sensing node once excitation is released, using the Q-factor sensing circuit; and
5) based upon at least the first resonance frequency, the second resonance frequency, and a frequency margin value, using a processing circuit to determine whether:
  a) a second wireless power circuit is in proximity to the wireless power circuit but a foreign object is not present in between a second wireless power circuit and the wireless power circuit; and
  b) a second wireless power circuit is in proximity to the wireless power circuit but a foreign object is present in between the second wireless power circuit and the wireless power circuit.

13. The method of claim 12, wherein determining that the second wireless power circuit is in proximity to the wireless power circuit but the foreign object is not present in between the second wireless power circuit and the wireless power circuit comprises determining that the second resonance frequency is less than the first resonance frequency minus the frequency margin value; and further comprising, in response to determining that the second wireless power circuit is in proximity to the wireless power circuit but that foreign object is not present in between the second wireless power circuit and the wireless power circuit, using a controller coupled to a bridge of the wireless circuit coupled to the coil to thereby cause the wireless power circuit to wirelessly transmit power at a full power level.

14. The method of claim 12, further comprising determining a Q-factor of the coil by taking first and second samples of an output voltage at the sensing node, using the processing circuit; and wherein determining that the second wireless power circuit is in proximity to the wireless power circuit but the foreign object is present in between the second wireless power circuit and the wireless power circuit is performed by:
  determining that the second resonance frequency is greater than the first resonance frequency plus the frequency margin value;
  determining that the second resonance frequency is less than the first resonance frequency less the frequency margin value;
  determining whether the Q-factor is less than a Q-factor margin value;
  determining whether the first sample is less than an amplitude margin value; and
  determining whether the second sample is less than the amplitude margin value.

15. The method of claim 14, wherein determining that the second wireless power circuit is not in proximity to the wireless power circuit and the foreign object is in proximity to the wireless power circuit is performed by determining that the second resonance frequency is greater than the first resonance frequency plus the frequency margin value.

16. The method of claim 15, wherein, in response to determining that the second resonance frequency is equal to the first resonance frequency, the processing circuit determines that the second wireless power circuit is not in proximity to the wireless power circuit and the foreign object is also not in proximity to the wireless power circuit.

\* \* \* \* \*